Patented Oct. 24, 1933

1,931,622

UNITED STATES PATENT OFFICE 1,931,622

RECOVERY OF CALCIUM HYPOCHLORITE

Heinrich Reitz, Bitterfeld, and Hans Ehlers, Sandersdorf, Germany, assignors, by mesne assignments, to Pen-Chlor, Incorporated, Philadelphia, Pa., a corporation of Delaware No Drawing. Application October 21, 1930, Serial No. 490,327, and in Germany October 28, 1929

5 Claims. (Cl. 23—86)

The present invention relates to improvements in the recovery of calcium hypochlorite from calcium hypochlorite-containing solutions and is more especially concerned with the production of calcium hypochlorite in a dry and extremely stable form from such solutions.

It has been frequently observed that solutions of calcium hypochlorite when exposed to elevated temperatures such as employed for concentration by evaporation tend to encounter a comparatively large loss in available chlorine. In order to diminish these losses it has heretofore frequently been proposed to carry out evaporation of calcium hypochlorite solutions at reduced pressure while simultaneously applying lower temperatures, say 50° C. However, even under these circumstances, evaporation of the solutions still entails a certain reduction of their available chlorine contents.

An object of the present invention is to provide a method of recovering dry crystallized calcium hypochlorite from calcium hypochlorite solutions with a minimum loss in available chlorine. At the same time it is no longer necessary to carry out evaporation under reduced pressure, ordinary pressure being entirely sufficient for evaporation at the temperatures employed.

According to the present invention, calcium hydroxide in a state of extremely fine subdivision is incorporated in the hypochlorite solution to be evaporated in a quantity which is at least just sufficient to impart to the solution a slight but lasting alkaline reaction. The resulting suspension is then finely dispersed (e. g. by spraying or atomizing) into air heated to the requisite temperature. Evaporation of the moisture thus takes place rapidly; the dried particles of calcium hypochlorite containing a small quantity of calcium hydroxide are allowed to settle and thus recovered.

The suspension of Ca(OH)$_2$ in the hypochlorite solution is preferably produced by dissolving crude crystals of calcium hypochlorite, as obtained in the usual manner by separation from the calcium chloride-containing mother-liquor (e. g. by sucking of, centrifuging, or filter-pressing), in water and precipitating a certain quantity of Ca(OH)$_2$ in the solution, e. g. by the addition of caustic soda lye. The hydrate of lime thus precipitated in a state of extremely fine dispersion acts as a protective substance against decomposition in the drying process. The quantity of alkali lye added to the solution of calcium hypochlorite should preferably not exceed its contents in calcium chloride, as the formation of sodium hypochlorite should be obviated because of its instability.

It should be noted that the employment of diluted solutions of raw calcium hypochlorite crystals is by no means an essential feature of the present process: It is equally possible to start from a hypochlorite solution previously concentrated up to its point of saturation in any known manner, e. g. by evaporating in vacuo and, after adding the necessary amount of a substance producing precipitation of hydrate of lime in a highly dispersed form, to subject the suspension thus obtained to the process as described. Further the invention is not limited to the production of the entirely dehydrated salt, as it is equally possible, if desired, to recover a partly dehydrated product by suitably adjusting the drying conditions of the present process and subsequently completely dehydrating the intermediary product in any other suitable manner, e. g. by simply exposing it to elevated temperatures and, if desired, in vacuo.

In view of the quality of the final product, it is advantageous to remove all objectionable contaminations, particularly carbonic acid, from the drying air to be employed in the process or substituting the air altogether by an indifferent gas such as nitrogen.

Example

To 7 cb. mtrs. of calcium hypochlorite lye containing 165 grs. per liter of available chlorine, 108 kgs. of Na(OH) dissolved to 125 ltrs. in water are added. The resulting mixture totals 7.125 cb. mtrs. and contains 160.8 grs. per liter of available chlorine and 14 grs. per liter of Ca(OH)$_2$, its total chlorine content being 96.8 grs. per liter and its specific gravity 1.14. This milky solution is atomized in a current of heated air having a temperature between 130 and 140° C., the actual drying temperature under these conditions amounting to 70–80° C. The completely dehydrated product thus recovered contains 75.4 percent of available chlorine instead of 79 percent as calculated. The loss in available chlorine encountered in the present process therefore only amounts to not more than 4.7 percent of available chlorine.

In contradistinction, when carrying out the drying in a similar manner but without providing for a slight but lasting alkaline reaction, the dried product only contains from 65–70 percent of available chlorine, the losses thus being considerably larger.

The temperatures of drying given in the foregoing example as well as the concentration of the starting solutions and the proportion in which the protective substance is added may be varied within comparatively wide limits.

We claim:

1. A process for removing water from calcium hypochlorite, which comprises adding to a calcium hypochlorite solution a substance imparting to the solution a slight but lasting alkaline reaction, and atomizing the resulting product in heated dry air.

2. A process for removing water from calcium hypochlorite, which comprises adding to an approximately saturated calcium hypochlorite solution a substance imparting to the solution a slight but lasting alkaline reaction, and atomizing the resulting product in heated dry air.

3. A process for removing water from calcium hypochlorite, which comprises adding to a calcium hypochlorite solution a small quantity of caustic soda solution just sufficient to produce in the solution a lasting alkaline reaction, and atomizing the resulting product in heated dry air.

4. A process for producing calcium hypochlorite in a dry and extremely stable form, which comprises adding to a calcium hypochlorite solution a substance producing in the solution a slight but lasting alkaline reaction, and atomizing the resulting product in heated dry air, the temperature of the air and the duration of its contact with the suspension being so regulated as to cause complete dehydration of the product.

5. A process for producing calcium hypochlorite in a dry and extremely stable form, which comprises adding to a calcium hypochlorite solution a small quantity of caustic soda solution just sufficient to produce in the solution a slight but lasting alkaline reaction, and atomizing the resulting product in heated dry air, the temperature of the air and the duration of its contact with the suspension being so regulated as to cause complete dehydration of the product.

HEINRICH REITZ.
HANS EHLERS.